(12) United States Patent
Park et al.

(10) Patent No.: US 11,696,200 B2
(45) Date of Patent: Jul. 4, 2023

(54) METHOD AND APPARATUS FOR SUPPORTING NETWORK SLICE WHEN UE MOVES BETWEEN 4G AND 5G NETWORKS

(71) Applicant: Samsung Electronics Co., Ltd, Suwon-si (KR)

(72) Inventors: Jungshin Park, Suwon-si (KR); Hoyeon Lee, Suwon-si (KR); Sunghoon Kim, Suwon-si (KR); Jungje Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 236 days.

(21) Appl. No.: 16/539,855

(22) Filed: Aug. 13, 2019

(65) Prior Publication Data
US 2020/0053617 A1    Feb. 13, 2020

(30) Foreign Application Priority Data

Aug. 13, 2018 (KR) .......................... 10-2018-0094438

(51) Int. Cl.
*H04W 36/14* (2009.01)
*H04W 8/02* (2009.01)
*H04W 36/00* (2009.01)

(52) U.S. Cl.
CPC ............. *H04W 36/14* (2013.01); *H04W 8/02* (2013.01); *H04W 36/0011* (2013.01)

(58) Field of Classification Search
None
See application file for complete search history.

(56) References Cited

U.S. PATENT DOCUMENTS

| 2018/0192337 | A1* | 7/2018 | Ryu | H04W 36/14 |
| 2019/0159025 | A1* | 5/2019 | Ben Henda | H04W 36/14 |
| 2019/0174405 | A1* | 6/2019 | Yang | H04L 41/5051 |
| 2019/0268806 | A1* | 8/2019 | Zhu | H04W 36/0033 |

(Continued)

FOREIGN PATENT DOCUMENTS

| EP | 3557905 A1 | 10/2019 |
| WO | 2018/008980 A1 | 1/2018 |
| WO | 2018/111030 A1 | 6/2018 |

OTHER PUBLICATIONS

Ericsson, "OI 4c: Handoverand slicing", SA WG2 Meeting #123, Oct. 23-27, 2017, S2-176981, 20 pages. (Year: 2017).*

(Continued)

*Primary Examiner* — Mariela Vidal Carpio

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure relates to a method of supporting a network slice of a network and a user equipment (UE) when the UE moves between a 4G network and a 5G network in the 3GPP 5G network technology.

10 Claims, 10 Drawing Sheets

(56) References Cited

U.S. PATENT DOCUMENTS

| | | | | |
|---|---|---|---|---|
| 2019/0274072 | A1* | 9/2019 | Prasad | H04W 12/0431 |
| 2019/0364541 | A1 | 11/2019 | Ryu | |
| 2020/0112898 | A1* | 4/2020 | Ramle | H04W 36/08 |
| 2020/0128450 | A1* | 4/2020 | Wang | H04W 88/04 |
| 2020/0187061 | A1* | 6/2020 | Zhu | H04W 36/0033 |
| 2020/0245127 | A1* | 7/2020 | Zong | H04W 36/0077 |
| 2020/0260340 | A1* | 8/2020 | Jing | H04W 36/0022 |
| 2020/0359274 | A1* | 11/2020 | Zhu | H04W 8/06 |
| 2020/0404551 | A1* | 12/2020 | Wang | H04W 36/14 |
| 2020/0413245 | A1* | 12/2020 | Zhu | H04W 8/26 |
| 2021/0007038 | A1* | 1/2021 | Li | H04W 76/00 |

OTHER PUBLICATIONS

NTT Docomo, LG Electronics, "Corrections to the Inter-system mobility procedures", 3GPP TSG-SA WG2 Meeting #125, Jan. 22-26, 2018, S2-180732, 13 pages. (Year: 2018).*

"5G; Procedures for the 5G System", 3GPP TS 23.502 version 15.2.0 Release 15, ETSI TS 123 502 V15.2.0 (Jun. 2018), 311 pages. (Year: 2018).*

5G;Procedures for the 5G System; (3GPP TS 23.502 version 15.2.0 Release 15) ETSI TS 123 502 V15.2.0, Jun. 2018, 311 pages.*

Nokia et al., "23.502: Correcting information flows in § 4.3 (PDU session related)", SA WG2 Meeting #124, Nov. 27-Dec. 1, 2017, S2-178255, 34 pages.

Ericsson, "Requested NSSAI in Network Initiated Change of Network slices", SA WG2 Meeting #128, Jul. 2-6, 2018, S2-186385, 4 pages.

Samsung, "Correction on Establishing a PDU Session in a Network Slice", 3GPP TSG SA WG2 Meeting #128, Jul. 2-6, 2018, S2-186725, 2 pages.

International Search Report dated Nov. 20, 2019 in connection with International Patent Application No. PCT/KR2019/009926, 3 pages.

Written Opinion of the International Searching Authority dated Nov. 20, 2019 in connection with International Patent Application No. PCT/KR2019/009926, 5 pages.

Extended European Search Report dated Jun. 29, 2021, in connection with European Patent Application No. 19849257.1, 13 pages.

Ericsson, "OI 4c: Handover and slicing", SA WG2 Meeting #123, S2-176981 (revision of S2-17xxxx), Oct. 23-27, 2017, Ljubljana, Slovenia, 20 pages.

NTT Docomo et al, "Corrections to the Inter-system mobility procedures", 3GPP TSG-SA WG2 Meeting #125, S2-180732, Jan. 22-26, 2018, Gothenburg, Sweden, 13 pages.

Office Action dated Sep. 8, 2022 in connection with India Patent Application No. 202137004646, 6 pages.

Decision of Patent dated Jan. 5, 2023 in connection with Korean Patent Application No. 10-2018-0094438, 13 pages.

\* cited by examiner

METHOD AND APPARATUS FOR SUPPORTING NETWORK SLICE WHEN UE MOVES BETWEEN 4G AND 5G NETWORKS

CROSS-REFERENCE TO RELATED APPLICATION

This application is based on and claims priority under 35 U.S.C. 119 to Korean Patent Application No. 10-2018-0094438 filed on Aug. 13, 2018 in the Korean Intellectual Property Office, the disclosure of which is herein incorporated by reference in its entirety.

BACKGROUND

1. Field

The disclosure relates to a method of supporting a network slice of a network and a user equipment (UE) when the UE moves between a 4G network and a 5G network in a wireless communication system, particularly, in the 3GPP 5G network technology.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

There is a desire for a method of easily handing over a user session by applying network slicing of a 5G network when a user equipment (UE) moves from a 4G network to the 5G network.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide a method of handing over a user session by applying network slicing of a 5G network when a user equipment (UE) moves from a 4G network to the 5G network.

Also, another aspect of the disclosure is to provide a method of handing over a session, which performs communication with the same external network (data network (DN)) via multiple network slices in the 5G network, to the 4G network when a UE moves from the 5G network to the 4G network. According to an embodiment, a UE can continuously use a service when the UE moves from the 4G network to the 5G network.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification.

Hereinafter, terms for identifying access nodes, terms indicating network entities, terms indicating messages, terms indicating interfaces between network entities, terms indicating various types of identification information, and the like are merely used for ease of description. Therefore, the disclosure may not be limited by the terms provided below, and other terms that indicate subjects having equivalent technical meanings may be used.

For ease of description, terms and names defined in the LTE and NR standards, which are the latest standard defined by the $3^{rd}$ generation partnership project (3GPP) among the currently existing communication standards, will be used. However, the disclosure is not limited by the terms and the names, and may be equally applied to a system that complies with other standards. Particularly, the disclosure may be applied to the 3GPP NR (the 5G mobile communication standard).

Figure 1:
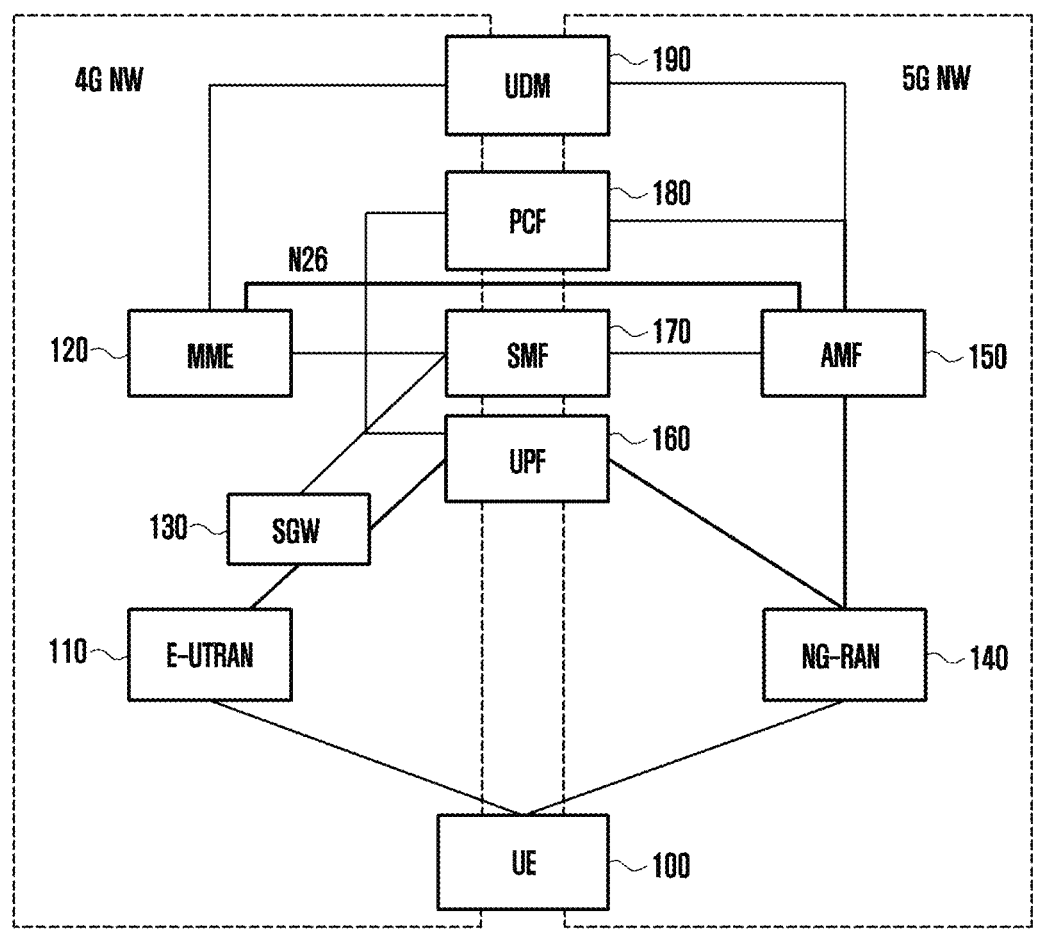
FIG. 1 illustrates an example structure of a network that supports mobility between 4G and 5G networks.

FIG. 1 illustrates example interworking structure between a 4G network and a 5G network, which will be used for description of the disclosure. The interworking structure may include a mobility management entity (MME) 120 which is the control plane element of the 4G network, an access and mobility management function (AMF) 150 which is a control plane element of the 5G network, and a session management function (SMF) 170 and a user plane function (UPF) 160 which are common data plane elements of the 4G and 5G networks.

Referring to FIG. 1, when a user equipment (UE) 100 moves from the 4G network to the 5G network, the MME 120 of the 4G network may transfer context of the UE 100 to the AMF 150 of the 5G network via an interface N26 in a handover signal transmission process. The AMF 150 of the 5G network may enable the UE 100 to maintain the session that has been used by the UE on the basis of the transferred context so that a service may be provided to the UE without disconnection.

When the UE 100 accesses the 4G network, the UE 100 may camp on an LTE eNB (E-UTRAN) 110. The MME 120 may manage mobile context, session context, and security information associated with the UE 100. A serving gateway (SGW) 130 may provide a user plane function. The MME 120 and the SGW 130 may be in the same physical entity.

When the UE 100 accesses the 5G network, the UE 100 may camp on an NR eNB 140. The 5G network may include an access and mobility management function (AMF) entity 150. The AMF 150 may perform the same functions of those of the MME 120 of the 4G network, or may perform at least some of the functions. For example, the AMF 150 may manage information associated with access authorization of a core network of the UE 100 and information associated with mobility of the UE 100.

Also, for 4G-5G interworking, the communication system may include the UPF 160 (PGW-U+UPF or UPF+PGW-U), the SMF 170 (PGW-C+SMF or SMF+PGW-C), a policy control function PCF 180 (PCF+PCRF or PCRF+PCF) and a UDM 190 (HSS+UDM or UDM+HSS).

For example, the UPF 160 may perform a routing function so that data is transmitted or received between the UE 100 and a data network on a user plane, and may perform an anchor function of allocating an Internet protocol (IP) address corresponding to the data network.

The SMF 170 may allocate an IP address for the UE 100, may control policy enforcement, and may perform general session management functions.

The PCF 180 is in charge of policy rules. The UDM 190 may authenticate credentials and assign access privileges.

Figure 2:
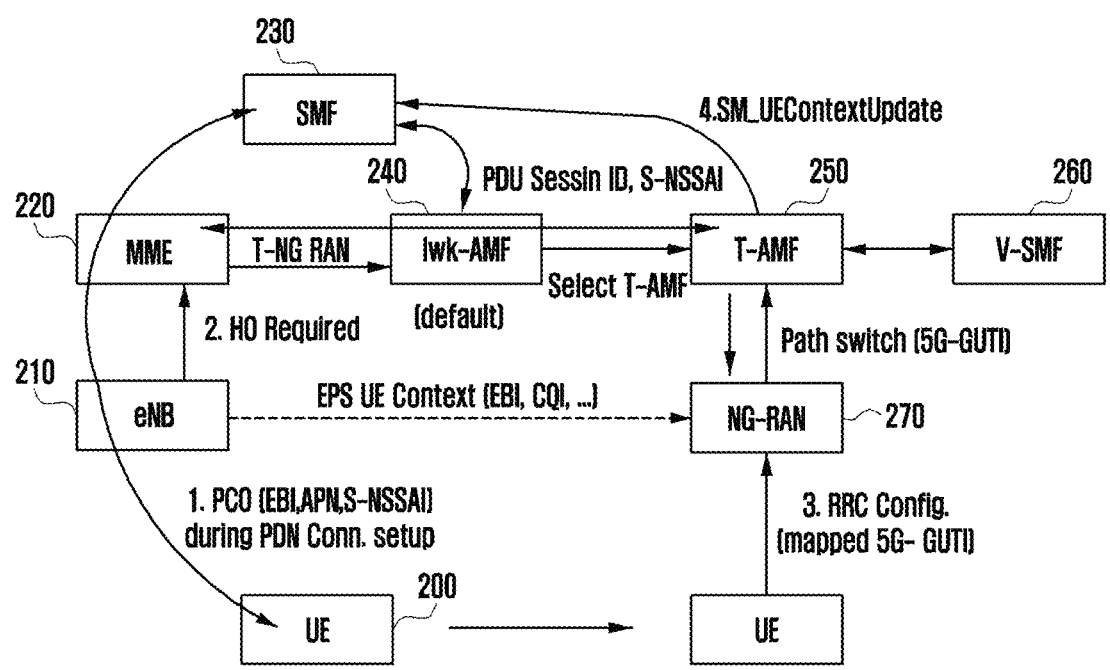
FIG. 2 illustrates an example schematic operation according to an embodiment.

FIG. 2 illustrates example network structure and operations performed between network elements, which will be used for description of the disclosure. For ease of description, a description is provided with reference to signal messages explicitly shown in the drawing, and although a basic handover procedure is not described, the handover procedure is applied normally.

The schematic operation of the disclosure will be described with reference to FIG. 2. First, in the process in which a UE 200 generates each user session (PDN connection) for a data service in the 4G network, the UE performs a process of previously allocating a PDU session ID and single-network slice selection assistance information (S-NS-SAI) of the 5G network which correspond to the 4G PDN connection by utilizing a protocol configuration option field of a session configuration signal message and an SMF 230. The S-NSSAI may be information for designating a network slice.

Second, if it is determined that the UE 200 needs to move from the 4G network to the 5G network on the basis of signal measurement information of the UE 200, a 4G evolved nodeB (eNB) 210 may select a target eNB 270 (in this instance, a 5G NG-RAN) to which the UE 200 is to move to. The 4G eNB 210 may transfer a HO required message to an MME 220 in order to start a handover procedure. The MME 220 may select the Iwk-AMF 240 that supports interworking between 4G and 5G on the basis of an AMF address set by an operator. For example, not all AMFs and SMFs support a network slice. In order to determine an AMF of a V-PLMN that supports a network slice as a target AMF, the Iwk-AMF may be determined. The MME 220 may transmit, to the Iwk-AMF 240, a handover request message including context information of the UE stored in the MME 220. The Iwk-AMF 240 identifies information associated with the SMF (H-SMF) 230 (multiple SMFs may be configured) corresponding to home-public land mobile network (H-PLMN) set for the UE 200 from the context information of the UE 200 received from the MME220, in order to identify each PDU session information and mapped network slice information corresponding to each PDN connection of the UE. In order to transfer session-related information of the user among the context of the UE to each SMF 230 of the H-PLMN, the Iwk-AMF 240 may select at least one temporary SMF (V-SMF_TMP) (or a plurality of SMFs) corresponding to a visited PLMN (V-PLMN), and transmits the session-related information to the SMF (H-SMF) 230 of the H-PLMN via the SMF (V-SMF) of the V-PLMN.

Each SMF (H-SMF) 230 of the H-PLMN replies, to the Iwk-AMF 240, each PDU Session information and mapped network slice information corresponding to each PDN connection of the UE. The Iwk-AMF 240 may collect received network slice information and may select a target-AMF (T-AMF) 250 capable of supporting all network slices (or network slices with priority) configured for the UE. For example, the T-AMF 250 may support handover of the UE 200. The Iwk-AMF 240 may transmit, to the T-AMF 250, the handover request signal message received from the MME 220.

On the basis of the context information related to the session of the UE, each PDU Session ID, and network slice information, the T-AMF 250 may select an SMF 260 of the V-PLMN for each PDU session. The SMF 260 may be a V-SMF corresponding to a V-PLMN. The T-AMF 250 may transmit the context information of the UE to the V-SMF 260. According to the normal handover procedure, the T-AMF 250 may transfer the handover request message to the NR-RAN (5G eNB or 5G LTE eNB) 270 explicitly specified in the handover request message, and the NG-RAN 270 may start with transferring a handover response message to the T-AMF, and may complete a handover standard procedure.

The NG-RAN 270 may store information associated with an identifier (UE ID) of the UE 200 and information associated with the T-AMF 250.

Third, the UE 200 moves to the 5G network, sets up a radio connection with the 5G network, and transmits an RRC Configuration message to the NG-RAN 270 in order to complete handover. In this instance, the UE 200 may include an MME ID in the message in the form of a mapped 5G-GUTI in order to transfer MME information of the 4G network. The NG-RAN 270 may transfer, to the T-AMF 250, the received mapped 5G-GUTI information in the process of transmitting a path switch signal message to the T-AMF 250 for completion of handover. The T-AMF 250 may determine that the UE 200 moves from the 4G network on the basis of the received mapped 5G-GUTI. The T-AMF 250 may transmit a handover complete signal message to the Iwk-AMF 240 using Iwk-AMF ID information which is stored in the handover preparation process in order to transfer a handover message.

The T-AMF 250 may transmit a PDU session update message to each SMF (V-SMF) 260 of the V-PLMN previously selected in the handover preparation process. Each SMF (V-SMF) 260 of the V-PLMN transmits an update message to an SMF (H-SMF) 230 of the H-PLMN corresponding to each PDU session, so that the SMF (H-SMF) 230 of the H-PLMN does not transmit a packet to the UE via the 4G network any longer, and transfers a packet to the UE via a data transmission path configured in the 5G network. The Iwk-AMF 240 (or a T-AMF autonomously performs identification if an Iwk-AMF is not used) identifies the corresponding MME 220 of the 4G network on the basis of the mapped 5G-GUTI information included in the handover complete message received from the T-AMF 250, and transfers the handover complete message to the MME 220. The MME 220 may transfer a response message to the Iwk-AMF 240 in response to the handover complete message. The Iwk-AMF 240 may transfer a handover complete response message to the T-AMF 250.

Figure 3A:
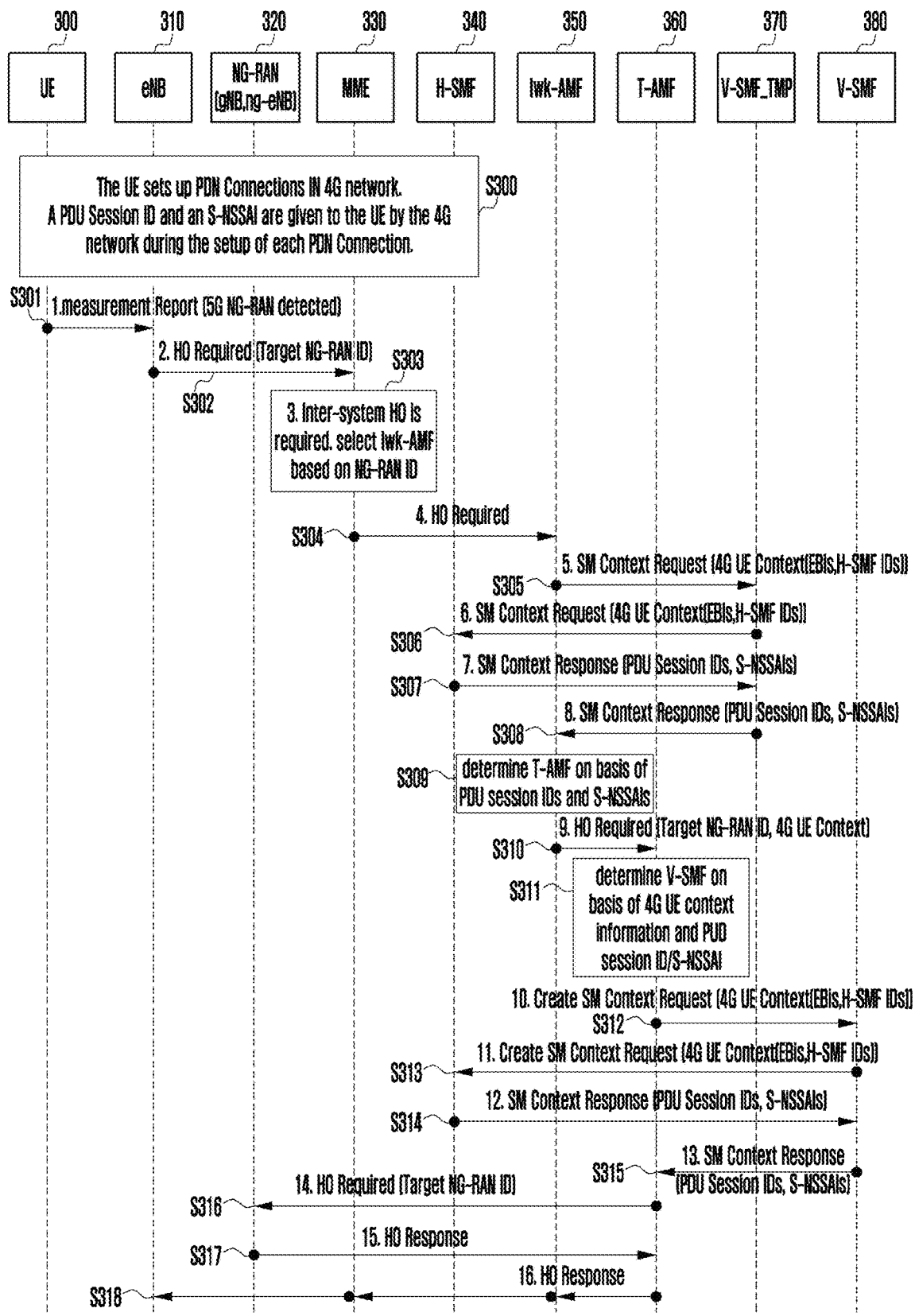
FIGS. 3A and 3B illustrate examples signaling procedure performed when a UE moves between 4G and 5G networks.
Figure 3B:
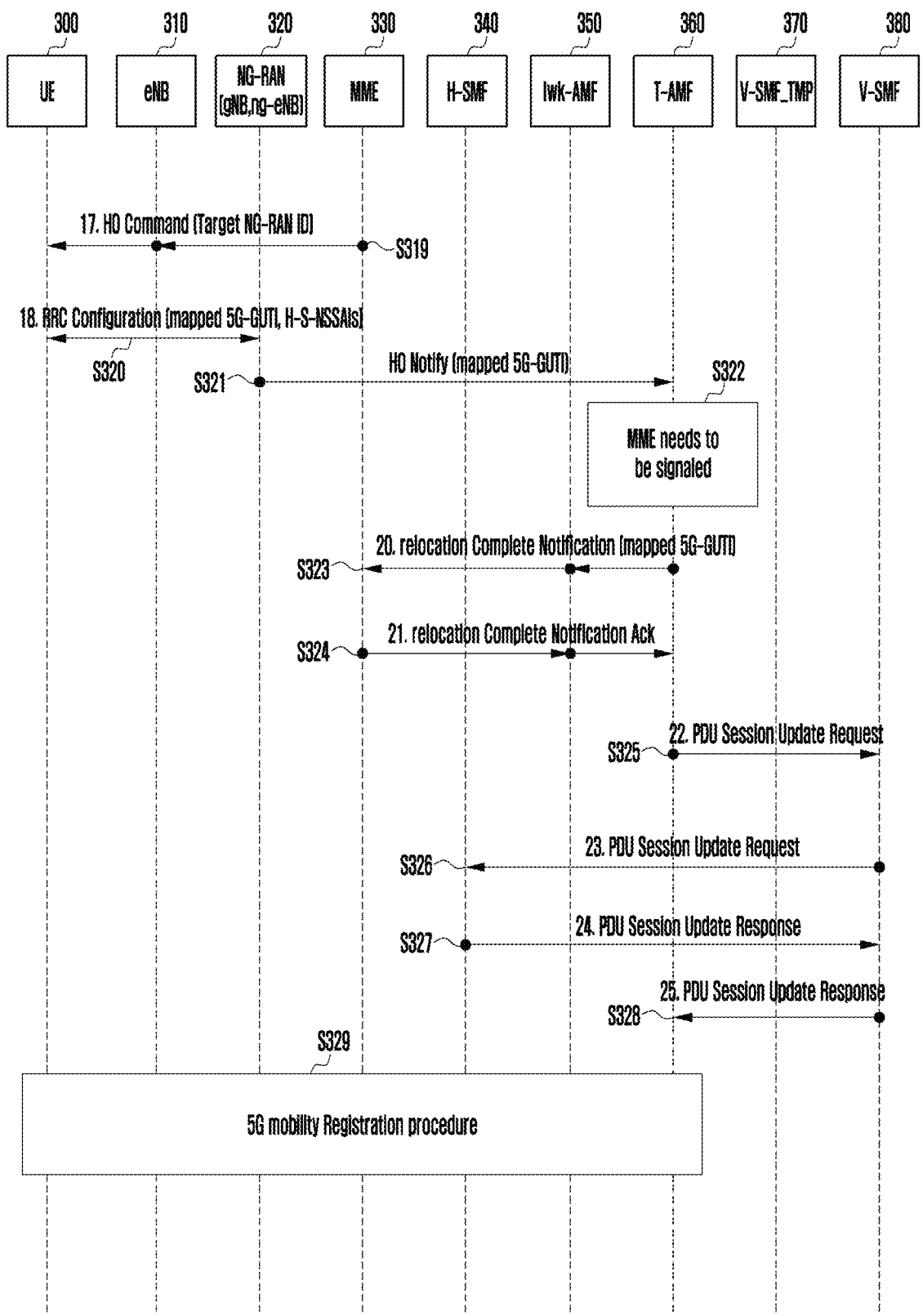

FIGS. 3A and 3B illustrate examples signaling procedure for handover that maintains a user session and applies network slicing of the 5G network, when a UE moves from the 4G network to the 5G network. It is preferable that FIGS. 3A and 3B are connected procedures.

According to the examples of FIGS. 3A and 3B, it is assumed that a UE 300 accessed the 4G network, set up a plurality of PDN connections, and has performed data transmission or reception when handover occurs. Also, it is assumed that the UE 300 and a network 340 (an SMF belonging to an H-PLMN (H-SMF)) transmits or receives a PDU session ID and network slice information (S-NSSAI) to be used in the 5G network on the basis of a corresponding PDN connection, via a signal message in the process of setting up each PDN connection.

The process No. 1 of FIG. 3A is a process in which the UE detects the 5G network and measures the strength of a signal, and reports the same to an eNB in the 4G network.

The process No. 2 of FIG. 3A is a process in which the eNB selects a target NG-RAN node of the 5G network and determines whether handover is needed on the basis of the signal strength information received from the UE, and transfers a HO required signal message to an MME in order to initiate a handover procedure.

The process No. 3 of FIG. 3A includes a process in which the MME determines that handover is an inter-system handover which is performed between the 4G network and the 5G network on the basis of target NG-RAN ID information included in the HO required message received from the eNB, and a process of transmitting the HO required message using Iwk-AMF information, corresponding to the corresponding target NG-RAN ID and set in the MME.

The process No. 4 of FIG. 3A is a process of extracting an SMF ID of the H-PLMN (hereinafter, an H-SMF ID) from UE context information received from the MME, and selecting a temporary SMF in the V-PLMN (hereinafter, a V-SMF_TMP) which is capable of transferring a signal message to the corresponding H-SMF in order to transfer the UE context information to the H-SMF and obtain network slice mapping information.

The process No. 5 of FIG. 3A is a process in which the Iwk-AMF transmits an SM context request signal message to the V-SMF_TMP selected in the process No. 4.

The process No. 6 of FIG. 3A is a process in which the V-SMF_TMP transmits the SM context request signal message to the H-SMF.

The process No. 7 of FIG. 3A is a process in which the H-SMF transmits, to the V-SMF_TMP, an SM context response signal message including a PDU session ID and network slice information (S-NSSAI) mapped for each PDN connection (or EPS Bearer) of the 4G network.

The process No. 8 of FIG. 3A is a process in which the V-SMF_TMP transmits, to the Iwk-AMF, the SM context response signal message received from the H-SMF.

The process No. 9 of FIG. 3A is a process in which the Iwk-AMF determines a network slice list needed for providing the service for the UE on the basis of the PDU session information and the network slice information (S-NSSAI) of the UE included in the SM context response message, selects a suitable T-AMF that is capable of supporting all network slices included in the list (or selectively supporting slices with priority), and transfers the HO required message received from the MME in the process No. 4 (in this instance, the IwK-AMF may make a reference to a network slice selection function (NSSF), an NF repository function (NRF), or the like in order to select a T-AMF, depending on implementation).

The process No. 10 of FIG. 3A is a process in which the T-AMF selects a suitable SMF in the V-PLMN (hereinafter, V-SMF) which is capable of supporting a network slice set in each PDU session for each PDU session, on the basis of the 4G UE context information and PDU session ID/S-NSSAI information included in the received HO required message, and transmits a Create SM context request signal message.

The process No. 11 of FIG. 3A is a process in which a V-SMF selected for each PDU session transfers the Create SM context request signal message to the H-SMF.

The process No. 12 of FIG. 3A is a process in which the H-SMF allocates a network resource required for a corresponding PDU session, and transmits a create SM context response signal message including the resource allocation information to the V-SMF.

The process No. 13 of FIG. 3A is a process in which the V-SMF transmits the create SM context response message to the T-AMF.

The process No. 14 of FIG. 3A is a process in which the T-AMF transfers the HO required message to the target NG-RAN node.

The processes Nos. 15 and 16 of FIG. 3A are processes of transferring a HO response message from the target NG-RAN node to the eNB of the 4G network.

Also, the process No. 17 of FIG. 3B performed after the processes of FIG. 3A is a process in which the MME transmits a HO Command signal message that commands to perform handover to the 5G network, to the UE via the eNB.

The process No. 18 of FIG. 3B is a process in which the UE transfers the ID information of the MME that the UE has accessed in the 4G network, in the form of a mapped 5G-GUTI via a signal message, in order to indicate handover from the 4G network when the UE moves to the 5G network and sets up a radio link with the target NG-RAN node.

The process No. 19 of FIG. 3B is a process in which the NG-RAN node completes setup of the radio link with the UE, and reports to the T-AMF that the UE is successfully handed over.

The process No. 20 of FIG. 3B is a process in which the T-AMF determines that the UE is handed over from the 4G network on the basis of the mapped 5G-GUTI information included in the signal message received from the NG-RAN node, and transfers a relocation complete notification signal message to the MME via the Iwk-AMF using the Iwk-AMF information stored in the process No. 5 (a temporary Iwk-AMF can be used in the case of a stateless network, depending on implementation), in order to transfer, to the MME of the 4G network, the relocation complete notification signal message indicating successful handover.

The process No. 21 of FIG. 3B is a process in which the MME identifies the successful handover of the UE to the 5G network, cancels the stored UE context and network resources associated with the UE, and transfers a relocation complete notification ACK signal message to the T-AMF via the Iwk-AMF.

The processes Nos. 22 to 25 of FIG. 3B are processes in which the T-AMF performs transmission or reception of a signal message with each V-SMF and each H-SMF, in order to change a data transmission path associated with a corresponding PDU session of the UE from a 4G network transmission path to a 5G network transmission path, for each PDU session. Also, after the above-described processes are completed, the UE and the network may perform a mobility registration procedure defined in the 5G standard, as needed.

Particularly, in operation S300 of FIG. 3A, the UE 300 may set up a PDN connection in the 4G network. A PDU session ID and S-NSSAI may be given to the 4G network in each PDN connection setup process.

In operation S301, the UE 300 may transmit a measurement report to a 4G eNB 310. For example, the UE 300 explores a 5G network and measures a signal strength, and may report a result to the 4G network eNB 310.

In operation S302, the eNB 310 that receives the measurement report may transmit a handover (HO) request message to an MME 330. In this instance, the eNB 310 may transmit a target 5G eNB ID (target NG-RAN ID) together. For example, the eNB 310 may determine a target 5G eNB on the basis of the measurement report transmitted by the UE 300, and may transmit the identifier of the determined target 5G eNB.

In operation S303, if it is determined that the MME 330 determines that an inter-system handover between 4G and 5G networks is needed, an Iwk-AMF 350 that supports interworking between the 4G and 5G networks is determined on the basis of the target 5G eNB ID.

In operation S304, the MME 330 may transmit a HO required message to the determined Iwk-AMF 350. In this instance, the MME 330 may transmit HO required message including UE context information of the UE 300.

The IwK-AMF 350 may extract an SMF ID (H-SMF ID) of a H-PLMN from the UE context information received from the MME 330. The Iwk-AMF 350 may transfer the UE context information to the H-SMF 340. In order to obtain network slice mapping information, the Iwk-AMF 350 may select a temporary SMF 370 in the V-PLMN (hereinafter, V-SMF_TMP) which is capable of transferring a signal message to the H-SMF 340.

In operation S305, the Iwk-AMF 350 may transmit an SM context request signal message to the selected V-SMF_TMP 370. The SM context request signal message may be the context information of the UE, and may include EPS bearer IDs (EBIs), which are bearer IDs used in the 4G network, and H-SMF IDs.

In operation S306, the V-SMF_TMP 370 may transmit the SM context request signal message to the H-SMF 340.

In operation S307, the H-SMF 340 may transmit, to the V-SMF_TMP 370, an SM context response signal message including a PDU session ID and network slice information (S-NSSAI) mapped for each PDN connection (or EPS bearer) of the 4G network.

In operation S308, the V-SMF_TMP 370 may transmit, to the Iwk-AMF 350, the SM context response signal message received from the H-SMF 340.

In operation S309, the Iwk-AMF 350 may collect received network slice information and may select the target AMF (T-AMF) 360 capable of supporting all network slices (or network slices with priority) configured for the UE. For example, the Iwk-AMF 350 may determine the T-AMF 360 on the basis of a PDU session ID and network slice information (S-NSSAI) mapped for each PDN connection (or EPS bearer) of the 4G network.

In operation S310, the Iwk-AMF 350 may transmit, to the T-AMF 360, the handover request signal message received from the MME 330.

In operation S311, the T-AMF 360 may determine an SMF (V-SMF) 380 of the V-PLMN on the basis of the 4G UE context information and a PDU session ID and network slice information (S-NSSAI) mapped for each PDN connection (or EPS bearer) of the 4G network.

In operation S312, the T-AMF 360 may transfer the UE context information to the V-SMF 380. For example, the V-AMF 360 may transmit the information via a create SM context request signal message.

In operation S313, the V-SMF 380 selected for each PDU session may transmit a create SM context request signal message including UE context information of the UE 300 to the H-SMF 340.

In operation S314, the H-SMF 340 may transmit an SM context response message to the V-SMF 380. For example, the H-SMF 340 may allocate a network resource needed for a corresponding PDU session, and may transmit a message including a PDU session ID and network slice information (S-NSSAI) to the V-SMF 380.

In operation S315, the V-SMF 380 may transmit, to the T-AMF 360, the SM context response message including the PDU session ID and the network slice information (S-NSSAI).

In operation S316, the T-AMF 360 may transmit a HO required message to a target NG-RAN 320. In operation S317, the target NG-RAN 320 may transmit a HO response message to the T-AMF 360.

In operation S318, the T-AMF 360 may transmit the received HO response message to the eNB 310 via the Iwk-AMF 350 and the MME 330.

In operation S319 of FIG. 3B, the MME 330 may transmit a HO command message to command the UE to perform handover to the 5G network, to the UE via the eNB 310. In this instance, the MME 330 may transmit the HO command including a target NG-RAN identifier.

In operation S320, the UE 300 may transmit the ID information of the MME 330 that the UE 300 has accessed in the 4G network, in the form of a mapped 5G-GUIT via a signal message, in order to indicate handover from the 4G network when the UE 300 moves to the 5G network and sets up a radio link with the target NG-RAN node. In this instance, the UE 300 may transmit the mapped 5G-GUTI information and S-NSSAIs (H-S-NSSAIs) information of the H-PLMN via an RRC configuration message.

In operation S321, the target NG-RAN 320 may transmit a HO notify message after completing generation of the radio link with the UE, in order to report, to the T-AMF 360, that the UE is successfully handed over.

In operation S322, the T-AMF 360 may determine that the UE 300 is handed over from the 4G network on the basis of the mapped 5G-GUTI information included in the signal message received from the NG-RAN 320, and may determine that the successful handover is needed to be reported to the MME 330 of the 4G network.

Therefore, in operation S323, the T-AMF 360 may transmit a relocation complete notification signal message to the MME 330 via the Iwk-AMF 350. In operation S324, the MME 330 that receives the relocation complete notification signal message may transmit a relocation complete notification ACK message to the T-AMF 360 via the Iwk-AMF 350.

In operation S325, the T-AMF 360 may transmit a PDU session update request message to the V-SMF 380. In this instance, in operation S326, the V-SMF 380 may transmit the received PDU session update message to the H-SMF 340. In operation S327, the H-SMF 340 may transmit a PDU session update response message to the V-SMF 380.

In operation S328, the V-SMF 380 may transmit the received PDU session update response message to the T-AMF 360.

In operation S329, the UE 300 may perform a mobility registration procedure with the 5G network.

Figure 4:
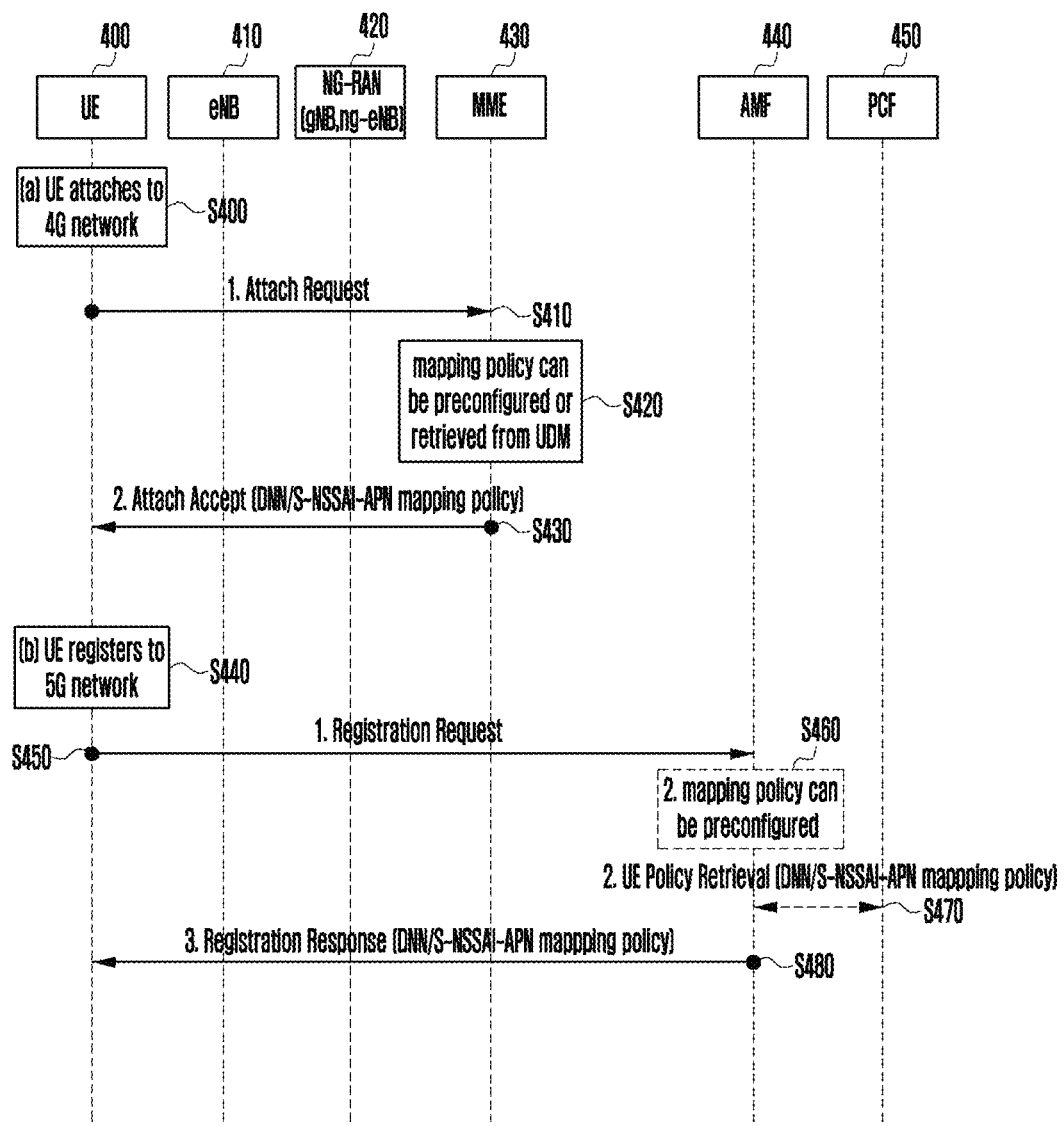
FIG. 4 illustrates example signaling procedure for session mapping when a UE moves between 4G and 5G networks.

FIG. 4 illustrates example signaling procedure for transmitting a 4G-5G session mapping policy between a UE and a network so that a user service is provided continuously when a UE moves between 4G network and 5G network.

In the state in which a UE in the 5G network communicates with the same external data network (DN) using different network slices, if the UE moves to the 4G network, since an external network having the same APN is incapable of communicating with the UE via different PGWs (in the case of interworking, SMFs and UPFs), a single connection, via which a service is continuously supported, needs to be selected among connections with the external data network via different network slices, which is a limitation. In order to overcome the drawback, there may be provided a method of mapping to an APN of the 4G network in consideration of each DNN (data network name) connected by each PDU session generated in the 5G network and network slice information (S-NSSAI) which each PDU session belongs to.

According to the provided method, if different network slice information (S-NSSAI) is used for a PDU session having the same DNN, a different APN is mapped when a UE moves to the 4G network, and the above-described limitation does not matter. Also, when the UE moves to the 4G network, services may be provided continuously with respect to all PDU sessions generated in the 5G network.

The above-described mapping between a DNN and S-NSSAI and an APN may be performed autonomously by a UE and a network in a handover process by utilizing conversion policy information set in advance between the UE and the network, instead of processing on the basis of an explicit signal message in the handover process, in order to minimize the effect of a change in implementation of the UE and the network. The conversion policy information (set by an operator) for mapping between the DNN and S-NSSAI and the APN may be set in the UE and the network, before handover occurs, according to a registration procedure performed with the 5G network (or Attach or TAU procedure performed with the 4G network) that the UE performs when the UE initiates operation or moves, or a separate policy update procedure (steps 1 and 2). The conversion policy information may be included as it is, or as a part of path selection policy information of the UE, and may be transmitted to the UE. Depending on an operator and implementation, the conversion policy information may be set in advance in the UE and the network via a separate offline procedure.

Particularly, in operation S400, a UE 400 may determine to attach to the 4G network. In operation S410, the UE 400 may transmit an attach request to an MME 430 of the 4G network.

In operation S420, the MME 430 may identify a mapped policy which is set in advance or is received from a UDM, as described above. In operation S430, the MME 430 may transmit an attach accept message to the UE 400. In this instance, the MME 430 may transmit, to the UE 400, policy information for mapping between a DNN and S-NSSAI and an APN.

In operation S440, the UE 400 may determine to register with the 5G network. In this instance, the UE 400 may transmit a registration request message to an AMF 440 in operation S450. In operation S460, the AMF 440 may identify the predetermined policy information for mapping.

In operation S470, the AMF 440 and a PCF 450 may search for and transmit or receive the policy information for mapping between the DNN and S-NSSAI and the APN.

In operation S480, the AMF 440 may transmit, to the UE 400, a registration response message including the policy information for mapping between a DNN and S-NSSAI and an APN.

Figure 5:
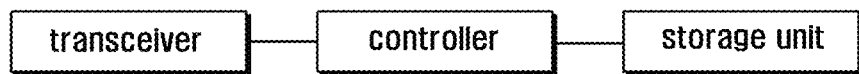
FIG. 5 illustrates example configuration of an evolved nodeB (eNB) according to an embodiment.

FIG. 5 illustrates example configuration of an eNB according to an embodiment.

Referring to FIG. 5, an eNB according to an embodiment may include a transceiver, a controller, and a storage unit. In the disclosure, the controller of the eNB may be defined as a circuit, an application-specific integrated circuit, or at least one processor.

The transceiver may perform transmission or reception of a signal with another network entity. For example, the transceiver may receive a radio signal from a UE, and may transmit a message for requesting handover to an MME.

The controller may control overall operation of the eNB according to the disclosure. For example, the controller of the eNB may control a signal flow among blocks so that operations in the drawings and flowcharts are performed.

The storage unit may store at least one piece of information transmitted or received via the transceiver, and information generated by the controller of the eNB. For example, the storage unit may store identification information (UE ID) of the UE of which a handover preparation process is completed, and mapping information of a T-AMF.

Particularly, the eNB may be a target eNB. In this instance, when receiving a handover request message from the T-AMF, the target eNB may store information associated with the UE in the storage unit. When the UE transfers a control message (e.g., an RRC configuration message) to the target eNB for network access during the handover process, the target eNB may control the transceiver to transmit an access request message of the UE to the T-AMF stored for the UE.

Figure 6:
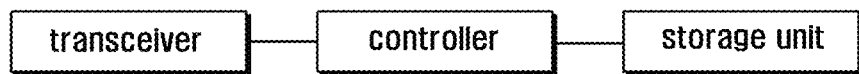
FIG. 6 illustrates example configuration of an MME according to an embodiment.

FIG. 6 illustrates example configuration of an MME according to an embodiment.

Referring to FIG. 6, an MME according to an embodiment may include a transceiver, a controller, and a storage unit. In the disclosure, the controller of the MME may be defined as a circuit, an application-specific integrated circuit, or at least one processor.

The transceiver may perform transmission or reception of a signal with another network entity. For example, the transceiver may receive a message for requesting handover from an eNB, or may transfer context information of the UE to an AMF.

The controller may control overall operation of the MME according to the disclosure. For example, the controller of the MME may control a signal flow among blocks so that operations in the drawings and flowcharts are performed.

The storage unit may store at least one piece of information transmitted or received via the transceiver, and information generated by the controller of the MME.

Figure 7:
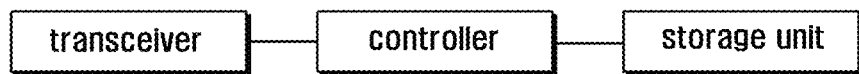
FIG. 7 illustrates example configuration of an AMF according to an embodiment.

FIG. 7 illustrates example configuration of an AMF according to an embodiment.

Referring to FIG. 7, an AMF according to an embodiment may include a transceiver, a controller, and a storage unit. In the disclosure, the controller of the AMF may be defined as a circuit, an application-specific integrated circuit, or at least one processor.

The transceiver may perform transmission or reception of a signal with another network entity. For example, the transceiver may receive context information of a UE from the MME, and may transmit session-related information of the UE to an SMF.

The controller may control overall operation of the AMF according to the embodiment of the disclosure. For example, the controller of the AMF may control a signal flow among blocks so that operations in the drawings and flowcharts are performed.

The storage unit may store at least one piece of information transmitted or received via the transceiver, and information generated by the controller of the AMF. The AMF of FIG. 7 may be an Iwk-AMF that supports interworking, as described above. Alternatively, the AMF may be a target AMF that supports handover of a UE and is determined by the Iwk-AMF.

If the AMF is an Iwk-AMF that supports interworking, the controller may control the transceiver to receive protocol data unit (PDU) session information of a UE and network slice information from a session management function (SMF) (H-SMF) corresponding to a home-public land mobile network (H-PLMN), and may determine a target AMF for supporting handover of the UE on the basis of the received PDU session information and network slice information.

Alternatively, the controller may control the transceiver to receive a handover request message including UE context information from an MME.

The controller may select at least one temporary SMF (V-SMF) corresponding to a visited PLMN (V-PLMN), may control the transceiver to transmit session management information configured on the basis of the UE context information to the at least one selected temporary V-SMF, and may control the transceiver to transmit the session management information to the H-SMF via the at least one selected temporary V-SMF.

The determined target AMF may determine an SMF (V-SMF) corresponding to the V-PLMN for each PDU session on the basis of the UE context information, the PDU session information, and the network slice information, and may transmit the UE context information to the determined V-SMF.

The controller may control the transceiver to transmit the received handover request message to the determined target AMF.

The network slice information may be single-network slice selection assistance information (S-NSSAI).

The IwK-AMF may be determined by a mobility management entity (MME) on the basis of information associated with a 5G eNB for handover of the UE and the address of a predetermined AMF.

The case in which the AMF is a target AMF that supports handover of a UE will be described. If the AMF is determined as a target AMF for supporting handover of a UE by an interworking access and mobility function (AMF) on the basis of the protocol data unit (PDU) session of the UE and network slice information, the controller may control the transceiver to receive a handover request message including UE context information, the PDU session information of the UE, and the network slice information, and may determine a session management function (SMF) (V-SMF) corresponding to a visited PLMN (V-PLMN) for the PDU session of the UE.

Figure 8:
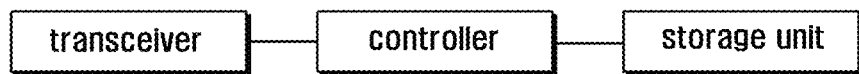
FIG. 8 illustrates example configuration of an SMF according to an embodiment.

FIG. 8 illustrates example configuration of an SMF according to an embodiment. The SMF may be an SMF corresponding to a H-PLMN or an SMF corresponding to a V-PLMN.

Referring to FIG. 8, an SMF according to an embodiment may include a transceiver, a controller, and a storage unit. In the disclosure, the controller of the SMF may be defined as a circuit, an application-specific integrated circuit, or at least one processor.

The transceiver may perform transmission or reception of a signal with another network entity. For example, the transceiver may receive session-related information of a UE from an AMF, and may transmit mapped network slice information according to an embodiment to the AMF.

The controller may control overall operation of the SMF according to the embodiment of the disclosure. For example, the controller of the SMF may control a signal flow among the blocks so that operations in the drawings and flowcharts are performed.

The storage unit may store at least one piece of information transmitted or received via the transceiver, and information generated by the controller of the SMF.

Figure 9:
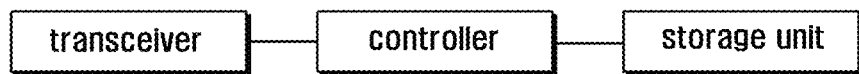
FIG. 9 illustrates example configuration of a user equipment (UE) according to an embodiment.

FIG. 9 illustrates example configuration of a UE according to an embodiment.

Referring to FIG. 9, a UE according to an embodiment may include a transceiver, a controller, and a storage unit. In the disclosure, the controller of the UE may be defined as a circuit, an application-specific integrated circuit, or at least one processor.

The transceiver may perform transmission or reception of a radio signal with an eNB according to an embodiment. For example, the transceiver may transmit a measurement report to an eNB according to an embodiment, and may receive an RRC configuration message corresponding to an HO command from the eNB.

The controller may control overall operation of the UE according to the embodiments. For example, the controller of the UE may control a signal flow among the blocks so that operations in the drawings and flowcharts are performed.

The storage unit may store at least one piece of information transmitted or received via the transceiver, and information generated by the controller of the UE. According to the above-described method, if a UE performs handover in the V-PLMN from the 4G network to the 5G network, although the UE transmits S-NSSAI corresponding to the H-PLMN to a 5G eNB, the 5G eNB may access an AMF suitable for the UE and may support a network slice since the 5G eNB stores the identifier of the UE and mapping information of a T-AMF that supports a network slice.

In the disclosure, a method in which an Iwk-AMF selects a T-AMF for supporting a network slice for a UE is provided.

The method may include a process of transmitting or receiving a signal message in order to obtain network slicing information for the UE from an H-SMF, and the process includes a method of selecting a temporary V-SMF-TMP. A method is provided in which the T-AMF sets a V-SMF on the basis of the network slice information of the UE received from the Iwk-AMF. A method is provided in which the T-AMF determines that the UE moves from the 4G on the basis of information received from the UE, the T-AMF reports that handover is completed to the MME via the Iwk-AMF, in the process in which the UE accesses the eNB via handover. In this instance, a method of storing an Iwk-AMF used in a handover preparation process and using the stored Iwk-AMF is provided.

Also, according to the disclosure, a method in which a UE maps network slice information and an external network name connected to each 5G session of a UE to an external network name connected to a 4G session when the UE moves from the 5G network to the 4G network, may include a method of mapping a pair of an external network name (5G DNN) connected via each 5G session and network slice information of the corresponding 5G session to an external network name (4G APN) connected with a 4G session corresponding to the 5G session.

In the above-described detailed embodiments of the disclosure, a component included in the disclosure is expressed in the singular or the plural according to a presented detailed embodiment. However, the singular or plural expressions are selected to be suitable for the provided situations for convenience of description, and the disclosure is not limited to the singular or plural elements. An element expressed in a plural form may be configured in singular, or an element expressed in a singular form may be configured in plural.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a first access and mobility management function (AMF) for interworking between a 5G system (5GS) and an evolved packet system (EPS) in a wireless communication system, the method comprising:
receiving, from a mobility management entity (MME), a handover request message including user equipment (UE) context information;
selecting a temporary session management function (SMF) corresponding to a visited-public land mobile network (V-PLMN)(V-SMF);

transmitting, to a home-public land mobile network (H-PLMN) SMF (H-SMF) via the selected temporary V-SMF, session related information included in the UE context information;

receiving, from the H-SMF via the selected temporary V-SMF, protocol data unit (PDU) session information and network slice information, the PDU session information being associated with session related information; and determining a target AMF based on the network slice information; and transmitting, to the determined target AMF, the handover request message.

2. The method of claim 1, wherein the UE context information includes SMF related information, and wherein the SMF related information is transmitted to the selected temporary V-SMF.

3. The method of claim 2, wherein the H-SMF is identified by the SMF related information.

4. The method of claim 1, wherein the network slice information comprises at least one single-network slice selection assistance information (S-NSSAI).

5. The method of claim 1, further comprising:

receiving, from the MME, information associated with a 5G base station and an address of a predetermined AMF.

6. A first access and mobility function (AMF) for interworking between a 5G system (5GS) and an evolved packet system (EPS) in a wireless communication system, the first AMF comprising:

a transceiver; and a controller coupled to the transceiver and configured to:

receive, from a mobility management (MME), a handover request message including user equipment (UE) context information, select a temporary session management function (SMF) corresponding to a visited- public land mobile network (V-PLMN)(V-SMF), transmit, to a home-public land mobile network (H-PLMN) SMF (H-SMF) via the selected temporary V-SMF, session related information included in the UE context information, receive, from the H-SMF via the selected temporary V-SMF, protocol data unit (PDU) session information and network slice information, the PDU session information being associated with the session related information, determine a target AMF based on the network slice information, and transmit, to the determined target AMF, the handover request message.

7. The first AMF of claim 6, wherein the UE context information includes SMF related information, and wherein the SMF related information is transmitted to the selected temporary V-SMF.

8. The first AMF of claim 7, wherein the H-SMF is identified by the SMF related information.

9. The first AMF of claim 6, wherein the network slice information comprises at least one single-network slice selection assistance information (S-NSSAI).

10. The first AMF of claim 6, wherein the controller is further configured to:

receive, from the MME, information associated with a 5G base station and an address of a predetermined AMF.

* * * * *